3 Sheets—Sheet 1

J. A. FREY.

Assignor by mesne assignments to C. Riessner.

COAL-OIL STOVE.

No. 7,674. Reissued May 8, 1877.

WITNESSES.

Jas. C. Hutchinson.

Henry C. Hazard.

INVENTOR.

Jno. A. Frey by

Prindle and Lacy his Attys

3 Sheets—Sheet 2

J. A. FREY.

Assignor by mesne assignments to C. Riessner.

COAL-OIL STOVE.

No. 7,674. Reissued May 8, 1877.

WITNESSES:
Jas. E. Hutchinson.
Henry C. Hazard

INVENTOR.
Jno. A. Frey, by
Prindle & Co. his Attys

3 Sheets—Sheet 3.

J. A. FREY.

Assignor by mesne assignments to C. Riessner.

COAL-OIL STOVE.

No. 7,674. Reissued May 8, 1877

WITNESSES:
Jas. E. Hutchinson
Henry G. Hazard

INVENTOR.
Jno. A. Frey, by
Prindle and Cox his Attys.

UNITED STATES PATENT OFFICE.

JOHN A. FREY, OF NEW YORK, N. Y., ASSIGNOR, BY MESNE ASSIGNMENTS, TO C. RIESSNER & CO.

IMPROVEMENT IN COAL-OIL STOVES.

Specification forming part of Letters Patent No. 118,358, August 22, 1871; reissue No. 7,674, dated May 8, 1877; application filed April 7, 1877.

*To all whom it may concern:*

Be it known that I, JOHN A. FREY, of New York city, county of New York and State of New York, did invent certain new and useful Improvements in Coal-Oil Stoves, for which Letters Patent No. 118,358 were issued to me upon the 22d day of August, 1871. which Letters Patent having been found defective, in that the specification and claims do not cover and embrace all of the original invention, as set forth in the application filed in the Patent Office on the 20th day of July, 1871. Now, therefore, being desirous of reissuing said Letters Patent, herewith surrendered, I have prepared and do hereby declare that the following is a full, clear, and exact description of the said invention, reference being had to the accompanying drawings, making a part of this specification, in which—

Figure 1:
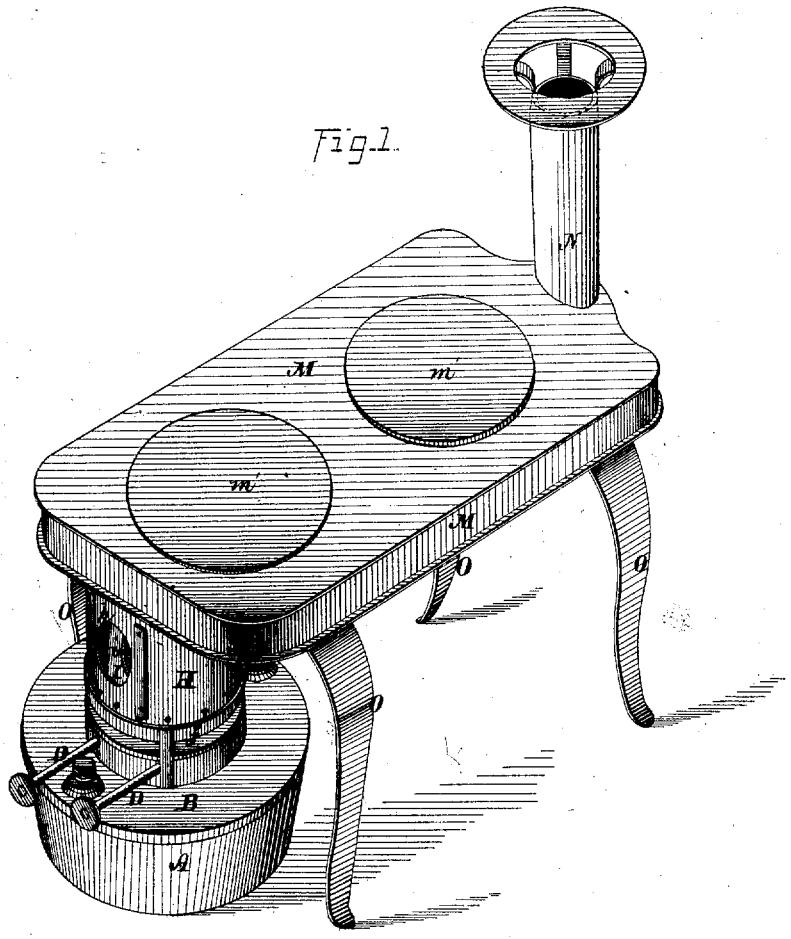
Figure 2:
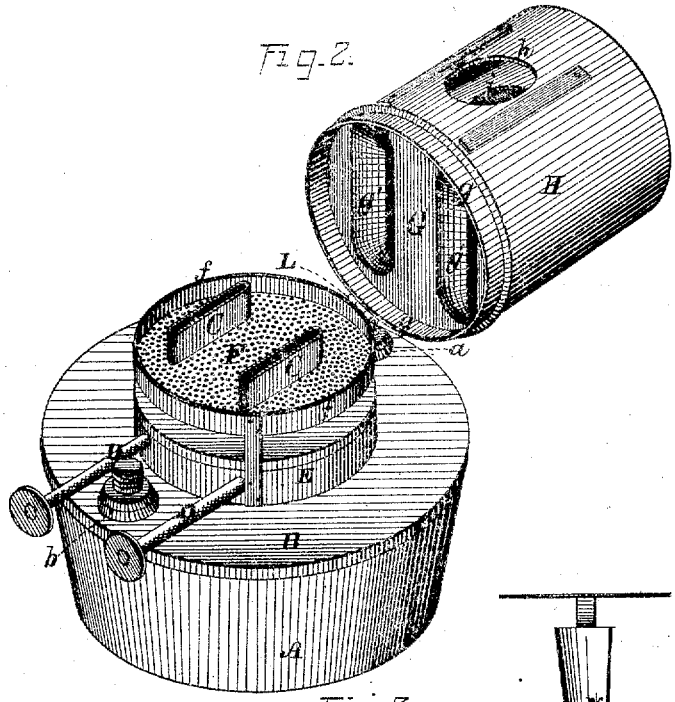
Figure 3:
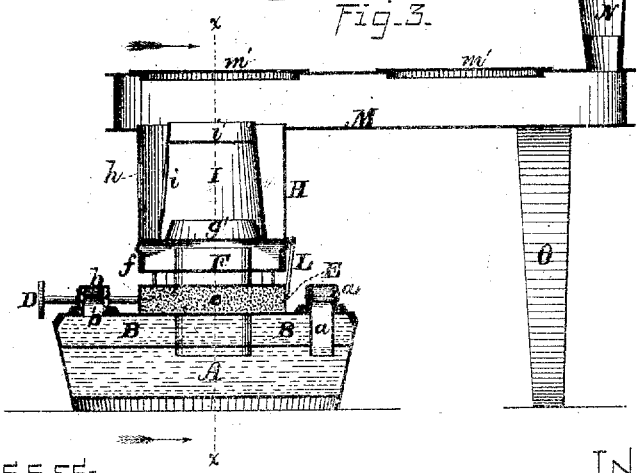
Figure 4:
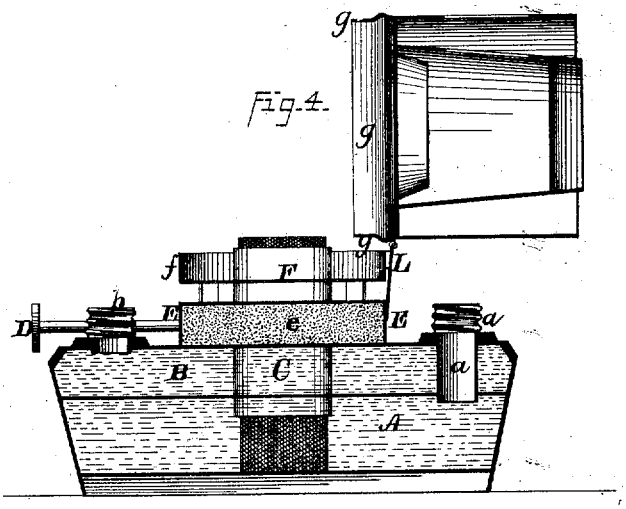
Figure 5:
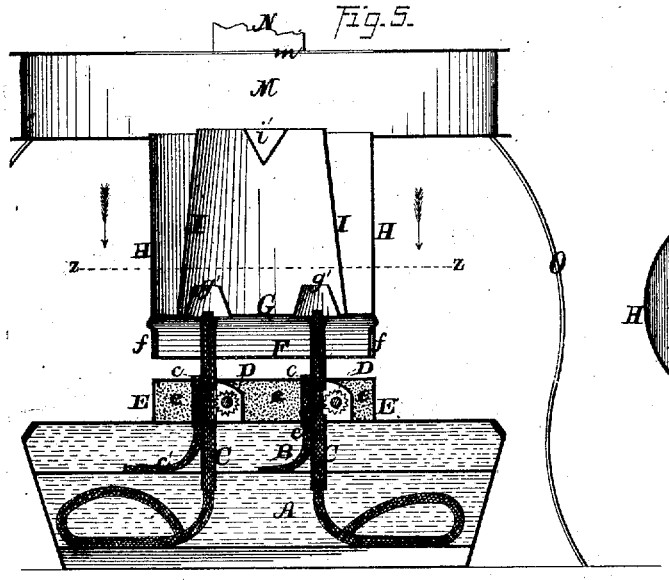
Figure 6:
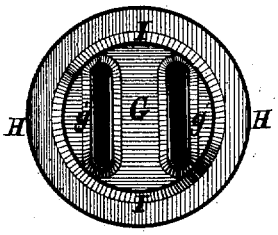

Figure 1 is a perspective view of my improved stove arranged for use. Fig. 2 is a like view of the heating portion of the same, separated from the top, and having its cylinder and cones turned to one side, so as to expose the wick-tube. Figs. 3 and 4 are, respectively, vertical central sections of Figs. 1 and 2, upon lines extending from front to rear. Fig. 5 is a like view upon line *x x* of Fig. 3, and Fig. 6 is a horizontal section upon line *z z* of Fig. 5.

Letters of like name and kind refer to like parts in each of the figures.

The design of my invention is to enable hydrocarbon oils to be employed for cooking purposes in a convenient, safe, and economical manner; and to this end it consists, principally, in the employment of a flange or rim, which surrounds the periphery of the cone-plate, and, extending downward from the edge of the same, is contained within the vertical wall of the air-space that is formed beneath said cone-plate, substantially as and for the purpose hereinafter shown.

It consists, further, in combining, with the cone-plate, provided with a downward-projecting annular flange, and with the upward-projecting flange or side wall of the air-space, a hinge which connects said parts together, substantially as and for the purpose hereinafter specified.

It consists, further, in a chamber arranged between the oil-reservoir and the air-space beneath the cone-plate, inclosing the wick wheels and shafts, and filled with cement or other non-conductor of heat, substantially as and for the purpose hereinafter set forth.

It consists, further, in the combination of the wick-cones, chimney or combustion-chamber, and deflector, substantially as and for the purpose hereinafter shown and described.

It consists, further, in the combination and construction of the parts which compose the heating portion of my stove, substantially as and for the purpose hereinafter specified.

It consists, finally, in the stove as a whole, its several parts being constructed and combined to operate in the manner and for the purpose substantially as hereinafter shown.

In the annexed drawings, A represents the oil-reservoir of my stove, constructed preferably in a circular form, and having a vertical or an outwardly and upward flaring side wall.

Immediately above the oil-reservoir A is a water-chamber, B, which is formed in part by the upward-extended side wall and the top of said reservoir, and is inclosed at its upper side, except where a tube, *b*, passes through its cover, and enables water to be placed within. Two wick-tubes, C, and an oil-supply tube, *a*, pass vertically through said water-chamber into said oil-reservoir.

The wick-tubes C are arranged at each side of the center of the reservoir A, and immediately above the water-chamber B are provided with the usual spur-wheels and operating-shafts D, for raising and lowering wicks within said tubes. Around the latter, upon said water-chamber, is formed a second chamber, E, which incloses said wick wheels and shafts, and is filled with a suitable non-conductor of heat, *e*.

Beside each wick-tube C is provided a tube, *c*, which extends through the cement chamber E, and furnishes communication between the space above the latter and the interior of the water-chamber B. A wick, *c'*, placed within said tube *c*, will cause water to pass from said chamber B, upward along said wick-tube, and assist in preventing the same from becoming overheated.

Surrounding and secured in horizontal position upon the wick-tube C, at a point midway between their upper ends and the cement-chamber E, is a perforated-plate, F, which at its edge is provided with an upward-projecting flange, *f*, that has a height of about three-fourths of an inch, and receives and incloses a correspondingly-shaped flange, *g*, which projects downward from a plate, G, that is provided with a cone, *g'*, for each wick-tube C, which cone is of ordinary form, and operates in the usual manner, to deflect the currents of air toward its wick, and cause said air to impinge upon the flame produced by the burning of the oil.

The flange *g* engages with the flange *f*, and insures the lateral position of the cone-plate and the parts attached thereto.

Secured upon and extending upward from the outer edge of the cone-plate G is a cylinder, H, which has a height of about six inches, and is open at its upper end.

Within the cylinder H is placed a sheet-metal cone, I, which, as seen in Fig. 6, is, in horizontal section, square, with rounded corners, and at its base incloses the cones *g'*, and from thence to the upper end of said cylinder H decreases somewhat in diameter.

Extending across the upper end of the cone I, midway between and parallel with the cones *g'*, is a V-shaped strip, *i'*, which operates as a deflector, and divides and turns outward in opposite directions the upward current of heated air from the burners.

The cone I operates as a shield to protect the cylinder H from the heat of the burners, and to prevent the outward passage of heat, the air-space between said cone and cylinder operating as a non-conductor of heat.

In order that the size of the flame of each wick may be known, so as to enable the largest quantity of heat to be produced without forming smoke, a mica window, *h*, is placed within one side of the cylinder H, and a similar window, *i*, within the same side of the cone I.

As the cylinder H and its attachments (the cone-plate G and cone I) must be removed each time the wicks are trimmed or lighted, I connect said cylinder to or with the stove, by means of a hinge, L, one leaf of which is fastened to the lower edge at one side of said cylinder, while the other leaf is secured to a contiguous portion of the stove, by which means said cylinder may be turned to one side, as shown by Fig. 2, without liability to the derangement of parts that would occur if said hinge was not employed.

The device thus constructed operates as follows: The reservoir A is filled with oil and the chamber B with water, after which the cylinder and caps are turned to one side, the wicks lighted, and said parts turned back to place.

The water in the chamber B operates to prevent heat from being radiated or transmitted downward to the oil-reservoir, and thus renders impossible the most frequent cause of the explosions of oil-lamps and stoves, while the cement-filled chamber affords equal protection to the wick-wheels and shafts, and, in connection with said water, prevents the central and lower portions of the wick-tubes from becoming sufficiently heated to vaporize the oil.

Articles to be cooked may be placed in suitable utensils over the upper end of the cylinder, but in order that the heat may be applied to two or more vessels at the same time, I place over the upper end of said cylinder one end of a horizontal flue, M, which, at its opposite end, is provided with a vertical pipe or flue, N, through which the heated products of combustion pass into the open air.

The flue M forms a stove-top, and is provided with a number of pot-holes, *m*, which have the usual form, and are inclosed, when not employed for the reception of vessels, by means of lids or covers *m'*. The end of said flue, opposite to the stove, is supported upon or by means of two legs, O.

Having thus set forth the nature and merits of my invention, what I claim as new is—

1. In combination with the cone-plate G, a flange, *g*, which extends from the edge of said plate downward inside of the flange *f*, substantially as and for the purpose shown.

2. In combination with the cone-plate G, having a downward-projecting annular flange, *g*, and with the upward-projecting flange *f*, that receives and contains said flange *g*, the hinge L, which is secured to and connects together said parts, substantially as and for the purpose specified.

3. In a coal-oil stove, a chamber located between the cone-plate and oil-reservoir, arranged to inclose the wick-wheels and their shafts, and filled with a non-conductor of heat, substantially as and for the purpose set forth.

4. The combination of the cone-plate G *g'*, cylinder H, chimney or cone I, and deflector *i*, substantially as and for the purpose shown and described.

5. The oil-reservoir A, water-chamber B, wick-tubes C, wick-wheels, and shaft D, cement-chamber E, perforated diaphragm F *f*, cone-plate G *g g'*, cylinder H, chimney-cone I, and deflector *i*, constructed and combined in the manner and for the purpose substantially as specified.

6. In combination with the heat-producing mechanism described, the stove-top M, provided with the pot-holes *m*, covers *m'*, exit-flue N, and legs O, substantially as and for the purpose shown.

In testimony that I claim the foregoing I have hereunto set my hand and seal this 31st day of March, A. D. 1877.

JOHN A. FREY. [L. S.]

Witnesses:
ADAM RIESSNER,
GEO. LERCH.